United States Patent [19]

Nakamura

[11] 3,752,486

[45] Aug. 14, 1973

[54] CASSETTE-TYPE MAGNETIC TAPE RECORDING AND REPRODUCING APPARATUS

[75] Inventor: Kinya Nakamura, Saitama-ken, Japan

[73] Assignee: Matsushita Electric Industrial Co., Ltd., Kadoma-shi, Osaka, Japan

[22] Filed: May 4, 1971

[21] Appl. No.: 140,233

[30] Foreign Application Priority Data

Mar. 14, 1968 Japan............................43/17084
Mar. 14, 1968 Japan.......43/17085(Utility Model)
Mar. 14, 1968 Japan.......43/20547(Utility Model)
Mar. 14, 1968 Japan.......43/20548(Utility Model)
Mar. 14, 1968 Japan.......43/20549(Utility Model)
Mar. 14, 1968 Japan.......43/20550(Utility Model)

Related U.S. Application Data

[62] Division of Ser. No. 780,645, Dec. 3, 1968, Pat. No. 3,632,113.

[52] U.S. Cl................................................... 274/4 C
[51] Int. Cl. .......................................... G11b 15/04
[58] Field of Search..................... 274/4 C, 4 E, 4 F, 274/4 G, 4 H, 11 C; 179/100.2 Z; 200/52 R, 50.3

[56] References Cited

UNITED STATES PATENTS

| | | | |
|---|---|---|---|
| 3,248,066 | 4/1966 | Andrews | 274/4 C |
| 3,179,753 | 4/1965 | Pollaschek | 200/50 C |
| 3,410,151 | 11/1968 | Adams | 200/50 C |
| 2,677,556 | 7/1972 | Oosone | 274/4 C |

*Primary Examiner*—Louis R. Prince
*Assistant Examiner*—Dennis A. Dearing
*Attorney*—Stevens, Davis, Miller & Mosher

[57] ABSTRACT

Apparatus to prevent inadvertent recording over a prerecorded tape in a cassette, comprising: a pivotally mounted L-shaped member having a projection for detecting the presence or absence of an opening in a cassette, which opening indicates the presence of a prerecorded tape therein; a blocking projection provided at the other end of the detecting lever and engaging a mechanical record mode actuating lever to block the movement of the record mode lever when the presence of a prerecorded tape is detected; and a record operation mode hold lever pivotally mounted for movement by the record mode lever to engage a pin on an operating mode change-over cammed member so as to hold the apparatus in the record mode when a prerecorded tape is not detected.

2 Claims, 16 Drawing Figures

CASSETTE-TYPE MAGNETIC TAPE RECORDING AND REPRODUCING APPARATUS

This application is a division of my co-pending application Ser. No. 780,645, filed Dec. 3, 1968, Pat. No. 3,632,113.

This invention relates to a cassette-type magnetic tape recording and reproducing apparatus and more particularly to such a magnetic tape-recording apparatus which comprises rotary-type operation-shifting means and which is simple in mechanism and enables accurate recording and reproducing operations to be obtained.

Many types of cassette-type magnetic tape recording and reproducing apparatus have been developed in recent years. For example, in the German Utility Model No. 1896300 there is disclosed a cassette-type magnetic tape recorder including a tape cartridge which has an opening formed in one side wall of the casing thereof solely for the admittance of a tape scanning mechanism and a push roll into said casing therethrough, an opening formed in the bottom wall of the casing for the admittance of driving shafts and three openings formed in the rear end wall of the casing, and a apring-biased pressing plate, particularly a felt plate, provided at the control one of said three openings in the rear end wall of the casing.

Further, in Japanese Pat. Publication No. 191/1968 there is disclosed a cassette-type magnetic tape recorder so designed that individual connections between the component parts of the recorder are effected by a tape cartridge.

The present invention contemplates the provision of a novel cassette-type magnetic tape recording and reproducing apparatus which is easier in handling, and is simpler and more rigid in structure than the conventional ones as mentioned above; which enables all the recording, reproduction, fast forward and rewinding operations to be obtained selectively by the operation of a single operation-shifting knob; which is capable of preventing dual recording by a very simple mechanism; and further which is small in size and can be produced at low costs.

It is, therefore, the primary object of the invention to provide a cassette-type magnetic tape recording and reproducing apparatus which comprises a rotary operation-shifting knob for selectively bringing the magnetic tape recording and producing apparatus into various states of operation and a movable base plate having a pinch roller and a head, etc. mounted thereon and operatively connected to said operation shifting knob to be operated thereby, said movable base plate being moved rectilinearly toward a tape cartridge when said operation shifting knob is revolved to a recording or reproducing position thereby carrying the pinch roller and the head, etc. into the tape cartridge in a direction perpendicular to the front end wall of said tape cartridge: and which therefore can be provided in a very small size due to the fact, in addition to the use of a tape cartridge, that the operation-shifting means of the type described above requires a much smaller space than the conventional push-button type, and enables a satisfactory recording, reproduction or tape forwarding operation to be obtained at all times due to the fact that the head is held in contact with a tape at a right angle thereto and also the pinch roller is held in pressure contact with the capstan accurately.

Another object of the present invention is to provide a cassette-type magnetic tape recording and reproducing apparatus which comprises a rotary operation-shifting knob, a control lever operatively connected to said operation-shifting knob is caused to make a sliding reciprocatory movement thereby, a tension roller and a rewinding idler operatively connected to said control lever to be displaced thereby, a motor-driven flywheel having a pulley fixedly mounted thereon and a belt engaged around said tension roller, said rewinding idler and said pulley, the arrangement being such that in a recording or reproduction operation said tension roller is displaced such that a line tangentially connecting the periphery of the tension roller and the periphery of the pulley is located inwardly of the periphery of a pulley mounted on one of reel-supporting discs, whereby a length of the belt extending between said first pulley and said tension roller is brought into pressure contact with said second pulley and at the same time a pinch roller is brought into pressure contact with a capstan, whereas in a fast forward operation said belt is maintained in pressure contact with said second pulley as in the recording or reproduction operation but the pinch roller is disengaged from the capstan, and further in a rewinding operation the tension roller is maintained in its retracted position, that is, the position in which said tension roller is placed in the inoperative state of the apparatus, while the belt is disengaged from said second pulley and at the same time the rewinding idler is brought into pressure contact with the other reel supporting disc, and thus shifting of the driving mechanism for all operations can be effected by the reciprocatory movement of the single control lever caused by the operation of the operation shifting knob and further the states of said respective operations can be brought about by very simple movements of the elements under the control of said control lever, i.e., by the movements of the tension roller and the pinch roller in case of the recording or reproduction operation, by the movement of the pinch roller in case of the fact forward operation and by the return movement of the tension roller and the movement of the rewinding idler into pressure contact with said other reel-supporting disc in case of the rewinding operation.

Still another object of the invention is to provide a cassette-type magnetic tape recording and reproducing apparatus which comprises an operation-shifting knob for shifting the magnetic tape recording and reproducing apparatus from an inoperative state to a state of recording reproduction or a state of rewinding, a movable base plate having a pinch roller and a recording or reproducing head mounted thereon and operated from said operation-shifting knob, and tape cartridge lifting means including an operating lever and a tape cartridge lifting lever pivotably disposed below a tape cartridge mounted on the body of said apparatus and operated by said operating lever, said cartridge lifting lever being operatively associated with said movable base plate in such a manner that when said movable base plate is moved from the operation shifting knob thereby carrying the pinch roller and the recording or reproducing head into the tape cartridge for recording or reproduction operation, said cartridge lifting lever is engaged by an engaging lug formed at a portion of said movable base plate, whereby said lever is locked against pivotal movement to ensure that the tape cartridge will not be lifted during the recording or reproduction operation by inadvertent operation of the operating lever.

Still another object of the invention is to provide a cassette-type magnetic tape recording and reproducing apparatus which comprises an operation-shifting knob for shifting a driving system from the inoperative state to the operative state, a switch for shifting an electric system from the state of recording to the state of reproduction or vice versa, a recording preventing lever adapted to make a pivotal movement between two positions depending upon the type of tape cartridge mounted on the body of said apparatus, a recording lever normally held immovable by said dual-recording preventing lever and a rotary lever operated by said recording lever and from said operation-shifting knob for actuating said switch, the arrangement being such that when the recording lever is operated in a movable state thereof, said rotary lever is caused to make a pivotal movement but not to actuate the switch and when the operation-shifting knob is revolved to a recording position successively thereafter, said rotary lever is further rotated from said operation-shifting knob to actuate said switch providing for recording operation, therefore the recording lever can be operated very lightly because it does not directly operate the switch but only causes a slight rotation of the rotary lever, and the operation of the operation-shifting knob is rendered easy because the recording lever can be held in the operative position lightly accordingly, and further dual recording can be avoided definitely because the recording lever is rendered operative or inoperative by the position of the dual-recording preventing lever which is determined by the type of tape cartridge mounted on the apparatus.

Still another object of the invention is to provide a cassette-type magnetic tape recording and reproducing apparatus of the type having a cavity formed in the body of the apparatus for mounting a tape cartridge therein and a cover adapted to close said cavity after said tape cartridge is mounted, in which one or more projections are provided on the inner surface of said cover either integrally or separately to press the top face of the tape cartridge so as to position said tape cartridge correctly relative to a head.

Still another object of the invention is to provide a cassette-type magnetic tape recording and reproducing apparatus which comprises a substantially L-shaped dual-recording preventing lever pivotally mounted at its fixed portion so as to take two positions depending upon the type of the tape cartridge mounted on the apparatus and having one end thereof located at a position to be engaged by a side wall of the tape cartridge and the other end thereof being normally held in engagement with a recording lever by which a switch to shift an electric system from a state of recording to a state of reproduction or vice versa is controlled, said engagment between the dual-recording preventing lever and the recording lever being released to provide for recording operation when the former is caused to make a pivotal movement according to the type of tape cartridge mounted on the apparatus.

Other objects, features and advantages of this invention will be better understood from the following description taken in connection with the accompanying drawings in which.

Figure 1:
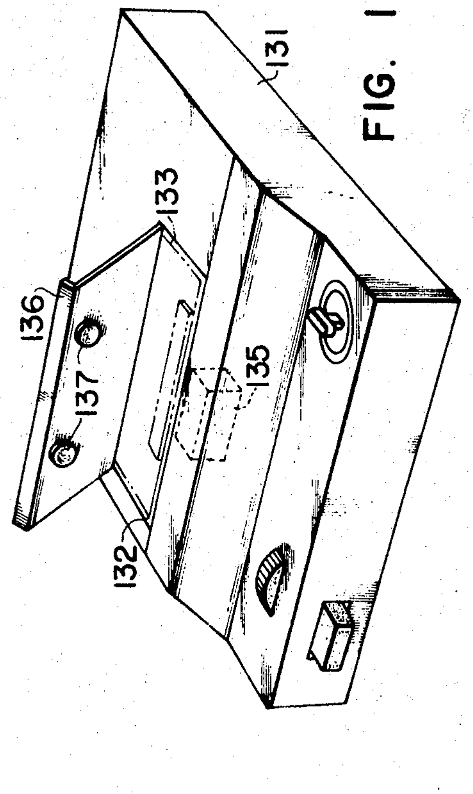
FIG. 1 is a perspective view of the body of a cassette-type magnetic tape recording and reproducing apparatus according to the present invention.
Figure 3:
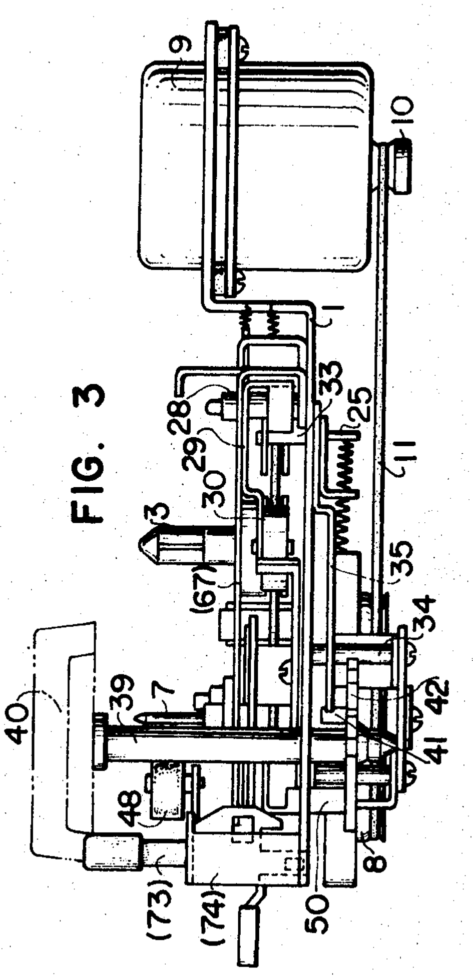
FIG. 3 is a side view of the mechanism shown in FIG. 2.
Figure 2:
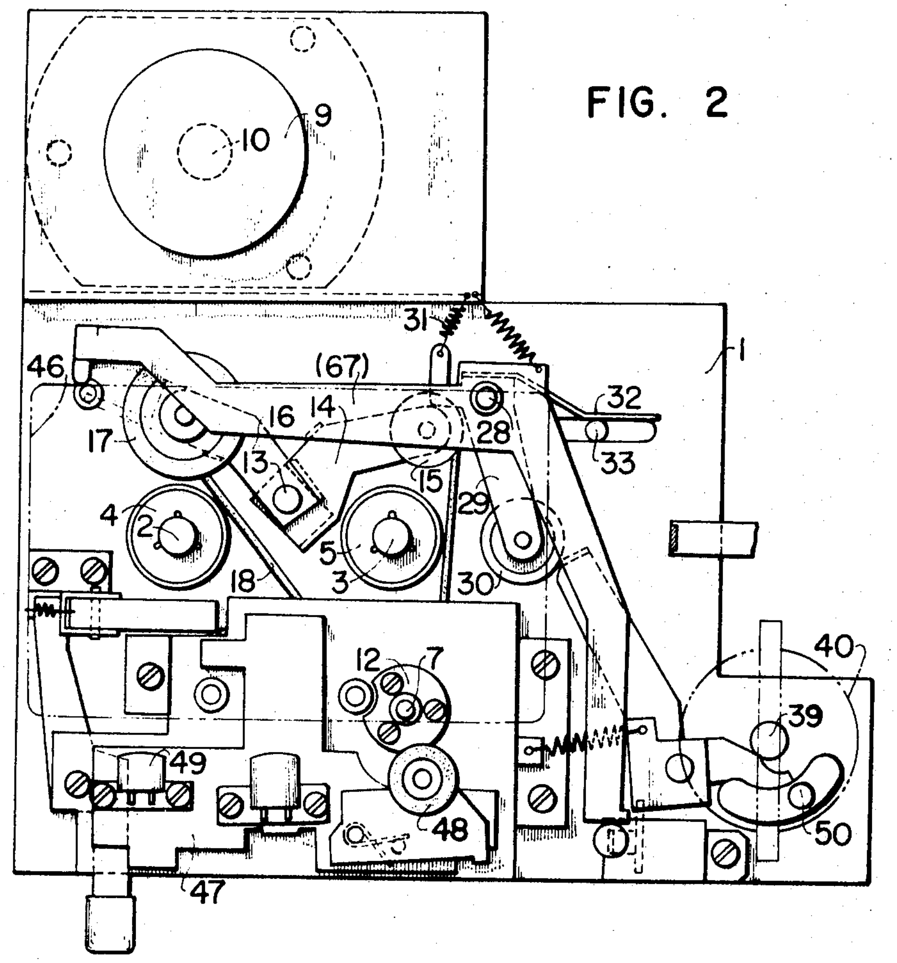
FIG. 2 is a top plan view, in a stationary position, of the mechanism of the cassette-type magnetic tape recording and reproducing apparatus of this invention.

A preferred embodiment of the present invention will be described hereinafter with reference to FIGS. 2 to 7 inclusive. A base plate 1 of the body of a magnetic tape recording and reproducing apparatus has reel shafts 2, 3 rotatably mounted thereon at a required space interval therebetween, with reel supporting discs 4, 5 fitted thereon respectively. One of the reel supporting discs 5 is in frictional engagement with a pulley 6, disposed below said reel supporting disc in pressure contact therewith, to be driven thereby.

In the proximity of the reel supporting disc 5 is rotatably provided a flywheel 8 which is integral with a capstan 7 and driven from a motor 9 through a pulley 10 and a belt 11. A pulley 12 is provided on the flywheel 8 integrally therewith. A tension arm 14 is pivotally mounted on a pin 13 at one end and carries a tension roller 15 at the other end. A lever 16 carrying a rewinding idler 17 at one end is also pivotally mounted on the pin 13 at the other end. A belt 18 is engaged around the pulley 12, the tension roller 15 and the rewinding idler 17. The tension arm 14 and the lever 16 are operationally controlled by a control lever 19, slidably disposed on the underside of the base plate 1, and to selectively drive the reel supporting discs 4, 5.

Namely, the control lever 19 has a slot 21 formed therein and slidable in a direction in which the reel-supporting discs 4, 5 are arranged, with a pin 20, provided on the base plate 1, received in said slot 21. The control lever 19 is joggled at the central portion thereof to form an abutting edge 22 extending at a right angle with the sliding direction of the lever, while the tension arm 14 is provided with a lug 23. The lug 23 of the tension arm 14 is held in pressure contact with the abutting edge 22 of the control lever 19 under the biasing force of a spring 24 which is anchored to said lug 23 at one end and to said control lever at the other end. On the other hand, the lever 16 is provided with a lug 25 which is held in pressure contact with the side edge of the control lever 19 under the biasing force of a spring 26 which is anchored to said lever 16 at one end and to the base plate 1 at the other end. Thus, it will be appreciated that when the control lever 19 is moved in the direction from the reel supporting disc 5 to the reel-supporting disc 4, the lug 23 of the tension arm 14 is pushed by the abutting edge 22 of the control lever 19, whereby the tension arm 14 is caused to rotate, whereas when the control lever 19 is moved in the opposite direction, the lug 25 of the lever 16 slides onto the edge of a notch 27 formed in the control lever, thereby causing the lever 16 to rotate slightly.

The diameter of the pulley 6 on the reel-supporting disc 5 is made slightly greater then the diameters of the pulley 12 and the tension roller 15. The peripheral edge of the pulley 6 is located inside of a line connecting the peripheral edge of the pulley 12 with the peripheral edge of the tension roller 15, that is, the belt 18. Therefore, in the stationary position of the mechanism shown in FIG. 4, the pulley 6 is not in contact with the belt 18.

A lever 29 is pivotally mounted on a pin 28 at one end and carries a roller 30 at the other end thereof. The roller 30 is normally located on a side opposite to the pulley 6 with respect to the belt 18 with a predetermined interval between it and the belt 18 because an arm 32, integral with the lever 29 and joggled at the central portion, is held in pressure contact at its free end with a pin 33 provided at an end of the control lever 19 under the bias of a spring 31 which has one end anchored to the lever 29 and the other end to the base plate 1. However, when the control lever 19 is moved in the direction from the reel-supporting disc 5 to the reel supporting disc 4, the pin 33 is located at the flexed portion of the arm 32, so that said arm 32 is rotated clockwise under the bias of the spring 31 and thus the roller 30 is moved toward the belt 18.

The pin 33 at one end of the control lever 19 is received in a fork 36 formed at one end of a coupling lever 35 which is pivotally mounted on a pin 34 at its flexed central portion. Rotation-shifting means by which the magnetic tape recording and reproducing apparatus is shifted from a stationary state to the state of recording or reproduction, of the state of fast forward or the state of rewinding, comprises a knob 38, a shaft 39, a cam plate 40 fixedly mounted on said shaft for simultaneous rotation and a pin 41 provided on said cam plate. The pin 41 is received in a fork 37 formed at the other end of the aforesaid coupling lever 35. Upon rotating the operation shifting knob 38, the coupling lever 35 makes a pivotal movement about the pin 34, causing a sliding movement of the control lever 19. The position of the operation shifting knob 38 is fixed during rotation of said knob, by the engagement between a plurality of round notches 42 formed in the peripheral edge of the cam plate 40 and a roller 44. The roller 44 is mounted on a lever 43 which is pivotally mounted on the base plate 1 and biased by a spring 45 such that said roller 44 is received under pressure in one of the round notches 42 in the peripheral edge of the cam plate 40.

On the other hand, the base plate 1 has a tape cartridge 46 mounted thereon. Also provided on the base plate 1 is a movable base plate 47 which has a pinch roller 48 and a head 49, etc. mounted thereon and is slidably movable toward the tape cartridge 46.

The movable base plate 47 is spaced apart from the tape cartridge 46 and accordingly the pinch roller 48 and the head 49 are held in a retracted position relative to said tape cartridge when the operation-shifting knob 38 is placed at the "stop" position. On the other hand, when the operation shifting knob 38 is shifted to the recording or reproducing position, the movable base plate 47 is moved toward the tape cartridge 46, whereby the pinch roller 48 and the head 49 are located within the tape cartridge. The operation shifting knob 38 is operatively connected with the movable base plate 47 in the following manner.

Namely, the cam plate 40, rotated by the operation-shifting knob 38, carries a pin 50 thereon and this pin 50 is in engagement with one end of a lever 51 which is pivotally mounted on a pin 52 with the other end extending to below the movable base plate 47. The movable base plate 47 is formed with an upright lug 53, while the lever 51 is formed with an upright lug 54 in opposed relation to said upright lug 53 and between the upright lugs 53 and 54 is provided a spring 55, whereby said movable base plate 47 is urged toward the lever 51.

When the operation-shifting knob 38 is in a stop position, the movable base plate 47 is held in a retracted position relative to the tape cartridge 46 due to the engagement between the lever 51 and the pin 50. However, when the operation shifting knob 38 is revolved to the recording or reproducing position, the lever 51 is pivoted in a clockwise direction by the pin 50, with the result that the movable base plate 47 is moved forward, carrying the pinch roller 48 and the head 49 into the tape cargridge 46. Incidentally, the lever 51 is biased to rotate in a counterclockwise direction under the bias of a spring 56 which is anchored to said lever at one end and to the base plate 1 at the other end.

Figure 4:
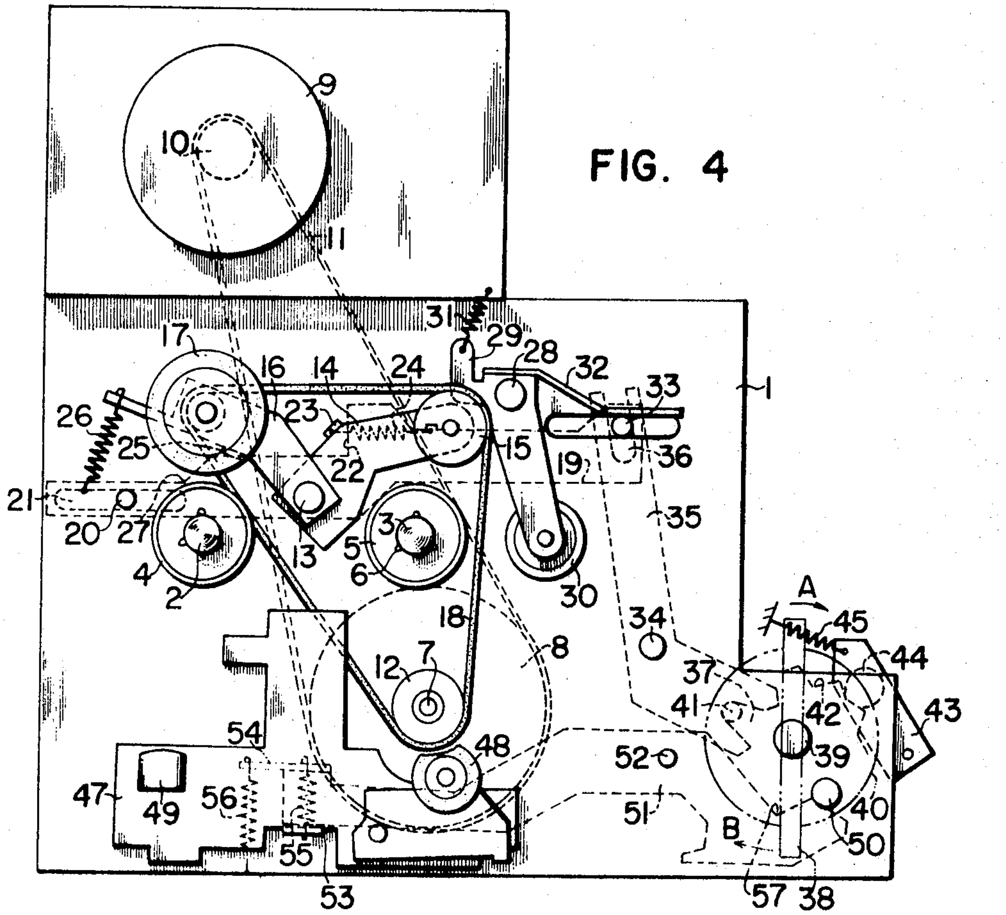
FIG. 4 is a top plan view mainly showing the positions of a tape-driving mechanism and a movable base plate in an inoperative position.
Figure 5:
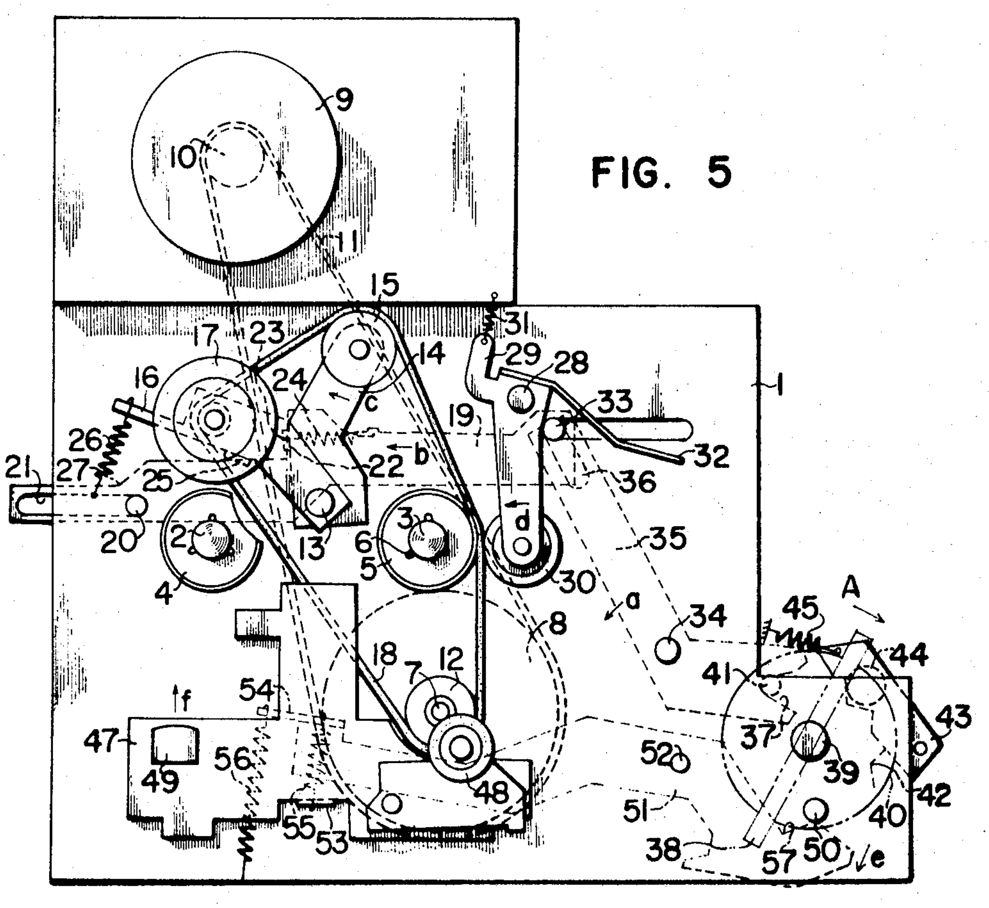
FIG. 5 is a top plan view of the mechanism shown in FIG. 4 in a recording or reproducing position.

The mechanism constructed as described above operates in the following manner: Namely, first of all, when the apparatus is in the stationary position, the operation shifting knob 38 is placed in the second one of its four positions as shown in FIG. 4. In this state, the control lever 19 is held stationary at the center of its sliding range and the tension roller 15 is located in a lower position of its moving path on substantially the same level as the control lever 19 under the bias of the spring 24. The belt 18 is spaced apart from the pulley 6 and the roller 30 is also spaced apart from the belt 18. Further, the rewinding idler 17 is spaced apart from the reel-supporting disc 4 as the upright lug 25 of the lever 16 is held upwardly by the side edge of the control lever 19 against the bias of the spring 26.

On the other hand, the lever 51 is held in a counterclockwise position under the bias of the spring 56 and accordingly the movable base plate 47 is immovably held in a retracted position relative to the tape cartridge 46, retaining the pinch roller 48 and the band 49 spaced apart from said tape cartridge.

The mechanism may be shifted from the stationary position described above to the recording or reproducing position by revolving the operation shifting knob 39 in the direction of arrow A into the first position. Namely, by revolving the operation shifting knob 38 in the direction of arrow A, the coupling lever 35 i s pivoted in the direction of arrow *n* (FIG. 5) by the pin 41 on the cam plate 40 and accordingly the control lever 19 is moved in the direction of arrow *b*, that is, the direction from the reel supporting disc 5 to the reel supporting disc 4. As a result, the tension arm 14 is caused to make a large swinging movement in the direction of arrow *c* by the engagement with the abutting edge 22 of the control lever 19 against the biasing force of the spring 24 while expanding the belt 18. Consequently, a line tangentially connecting the peripheral edge of the pulley 12, integral with the flywheel 8, and the peripheral edge of the tension rroller 15 is located inwardly of the peripheral edge of the pulley 6, so that the belt 18 is brought into pressure contact with the pulley 6. Since, upon revolving the operation shifting knob 38 in the direction of arrow A, a power source switch is actuated, the motor 10 is placed in operation and the pulley 6 is driven from the motor 10 through the belt 11 and the flywheel 8, whereby the reel-supporting disc 5 is rotated by the friction between it and said pulley 6.

Incident to the sliding movement of the control lever 19 in the direction of arrow *b*, the pin 33 is also displaced in the same direction to be located at the flexed portion of the arm 32, so that the lever 29 makes a pivotal movement about the pin 28 in the direction of arrow *d* under the bias of the spring 31, thus bringing the roller 30 into pressure contact with the belt 18. Therefore, the belt 18 is further pressed against the pulley 6 under the biasing force of the spring 31, providing for positive transmission of the driving force.

On the other hand, the pin 50 on the cam plate 40, upon revolution of the operation shifting knob 38 in the direction of arrow A, urges the lever 51 to rotate in the direction of arrow *e*. As a result, the movable base plate 47 is moved in the direction of arrow *f* or toward the tape cartridge 46 through the spring 55, so that the pinch roller 48 and the head 49 are carried into said tape cartridge and the pinch roller 48 is brought into pressure contact with the capstan 7 through the intermediary of a tape in said tape cartridge and the head 49 with the tape.

In the manner described, the motor 10 is placed in operation, the capstan 7 is rotated and the reel supporting disc 5 is rotated upon revolution of the operation shifting knob 38 in the direction of arrow A, and tape winding, recording or reproduction is carried out.

The pulley 6, driven by the belt 18, rotates at a peripheral speed greater than that of the capstan 7. However, the reel supporting disc 5 takes up the tape being delivered by the capstan 7, in a recording or reproducing operation, while slipping on the pulley 6 because said reel supporting disc 5 is driven by the friction between it and said pulley 6.

Next, in order to place the mechanism in the state of fast forward, the operation shifting knob 38 is further revolved in the direction of arrow A from the position for recording or reproduction, said direction being hereinafter referred to as the direction of arrow A'.

Figure 6:
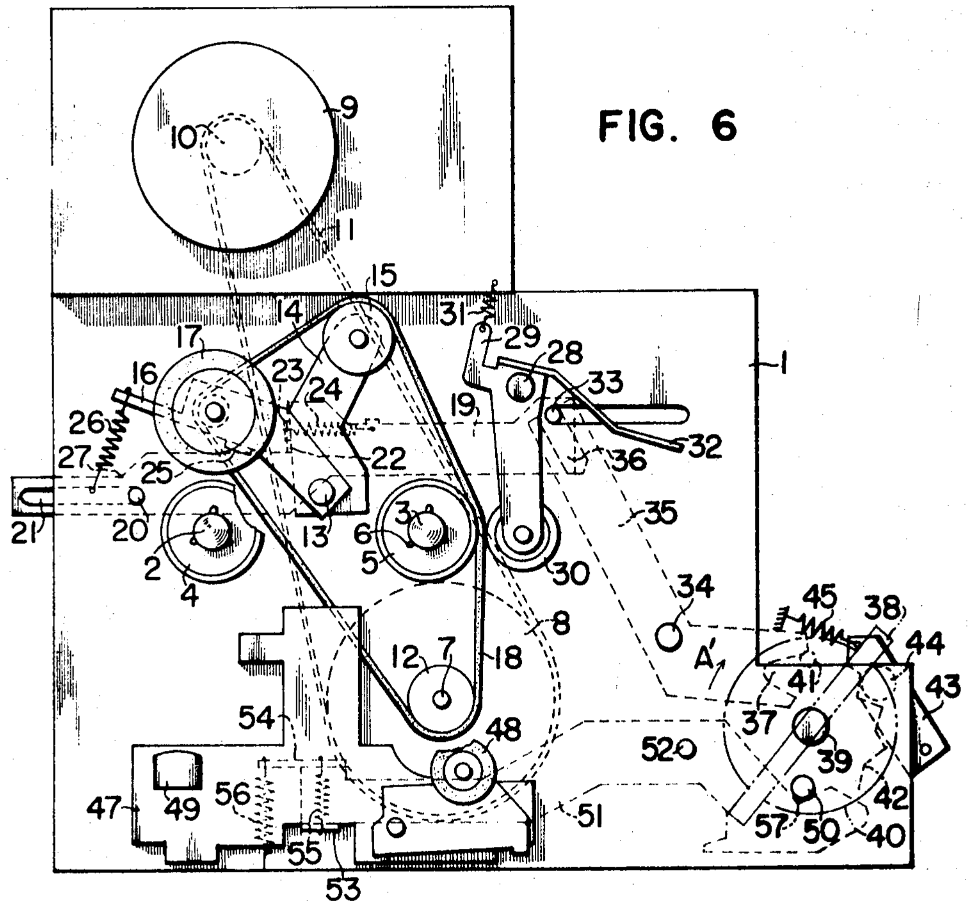
FIG. 6 is a top plan view of the mechanism shown in FIG. 4 in a fast forward position.

Namely, by revolving the operation shifting knob 38 from the position for recording or reproduction in the direction of arrow A' shown in FIG. 6, the pin 41 on the cam plate 40 is moved out of the fork 37 of the coupling lever 35 and brought to a position in contact with the tip end of said coupling lever. Therefore, the coupling lever 35 is not rotated and remains in exactly the same position as in the case of recording or reproduction and likewise the belt 18 is continuously held in pressure contact with the pulley 6 in its position. On the other hand, the pin 50 on the cam plate 40 is moved into a recessed portion 57 of the lever 51, incident to the rotation of the operation shifting knob 38 in the direction of arrow A', so that the detention force of said pin 50, having been exerted on said lever, is removed therefrom, allowing said lever 51 to return to its original position under the biasing force of the spring 56. Incident to the return movement of lever 51, the movable base plate 47 is retracted under the biasing force of the spring 55 and accordingly the pinch roller 48 and the head 49 are carried away from the tape cartridge 46. Therefore, the tape is taken up on the reel supporting disc 5 being driven by the pulley 6.

In this case, since the tape is subjected to no influence from the capstan 7 and the reel supporting disc 4 is in an idling position, the tape winding operation can be carried out under an extremely small load and therefore no slippage occurs between the reel supporting disc 5 and the pulley 6. Namely, fast forwarding of the tape is possible.

Now, when the tape is desired to be rewound, this can be attained by revolving the operation shifting knob 38 from the position shown in FIG. 4 in the direction of arrow B opposite to the direction of arrow A.

Figure 7:
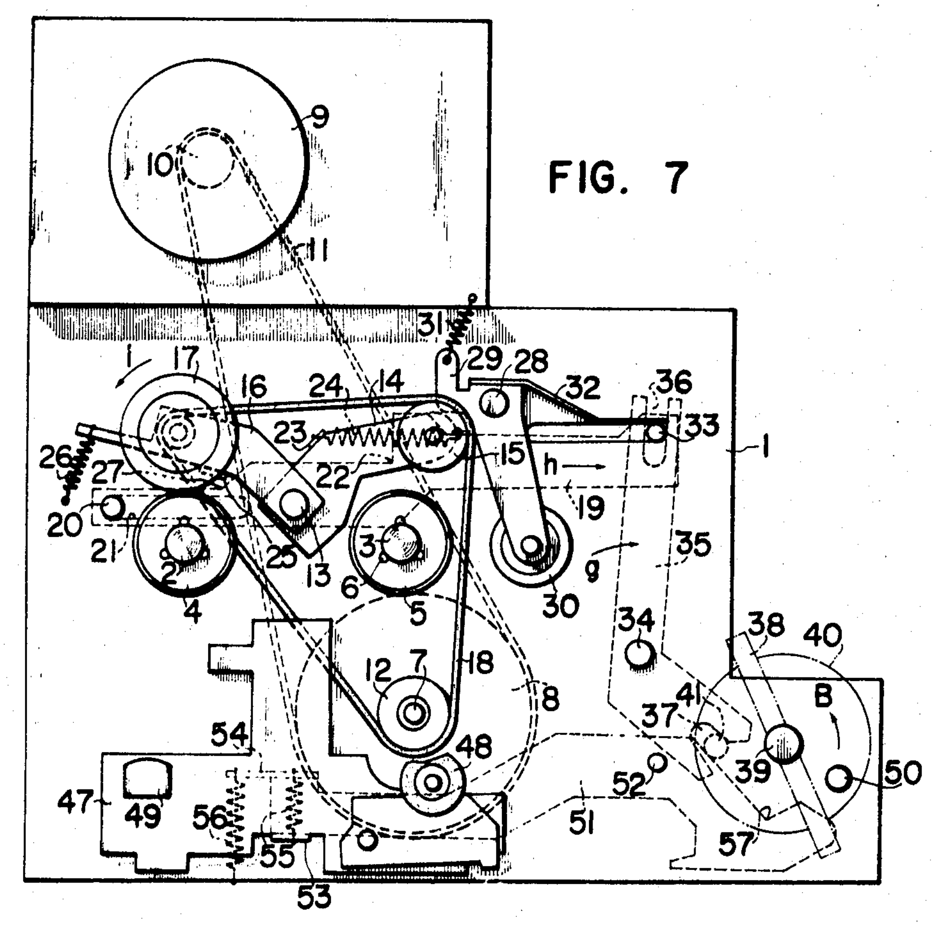
FIG. 7 is a top plan view of the mechanism shown in FIG. 4 in a rewinding position.

Namely, by revolving the operation shifting knob 38 in the direction of arrow B, as shown in FIG. 7, the coupling lever 35 is caused to rotate in the direction of *g* by the pin 41 on the cam plate. The control lever 19, therefore, is moved in the direction of arrow *h*, that is, the direction from the reel supporting disc 4 to the reel supporting disc 5. In this case, the position of the tension roller 15 remains unchanged because the abutting edge 22 of the control lever 19 is only moved away from the upright lug 23 of the tension arm 14. The belt-pressing roller 30 is also maintained in its position because the pin 33 on the control lever 19 only slides on the horizontal surface of the arm 32. On the other hand, upon a sliding movement of the control lever 19 in the direction of arrow *h*, the upright lug 25 of the lever 16 falls in the resessed portion 27 under the biasing force of the spring 26, whereby the lever 16 is allowed to rotate in the direction of arrow *i* and thus the rewinding idler 17 is brought into pressure contact with the peripheral surface of the reel-supporting disc 4 under the biasing force of the spring 26.

As in the case of revolving the operation-shifting knob 38 in the direction of arrow A, the motor 10 is connected to the power source when said knob is revolved in the direction of arrow B, so that the rewinding idler 17 is driven from the motor through the belt 18 and the reel supporting disc 4 is driven by said rewinding idler.

In this case, the movable base plate 47 is maintained in the same position as in the case when the mechanism is held inoperative, because the pin 50 on the cam plate is moved away from the lever 51 upon revolution of the operation shifting knob 38 in the direction of arrow B, and accordingly the pinch roller 48 and the head 49 are located remote from the tape cartridge 46. In the manner described, the reel supporting disc 4 is rotated for the rewinding operation.

Next, the apparatus of this invention which is so designed as to avoid dual recording and to be brought into a recording position by a very simple operation will be described by way of example with reference to FIGS. 8 to 11 inclusive. A base plate 61 of the body of a magnetic tape recording and reproducing apparatus is provided with reel shafts 62, 63 at a required interval and a tape cartridge 64 is mounted on said reel shafts. Also, a provision is made for mounting the tape cartridge in a prescribed position.

The tape cartridge 64 is mounted on the reel shafts 62, 63 from above the cartridge mounting portion 65 while slightly moving it in the direction of arrow C.

On that portion of the base plate 61 located below the tape cartridge mounting portion 65 is provided a dual recording preventing lever 67 which is pivotally mounted on a pin 66 at a flexed portion thereof. The lever 67 is provided with a projection 68 at the end of its arm which extends along the rear side of the tape cartridge mounting portion 65, projection 68 being adapted to be brought into contact with the rear surface of the tape cartridge 64 when said tape cartridge is mounted in position. The lever 67 is also provided with a projection 69 at the end of the other arm thereof which extends forwardly along one side of the tape cartridge mounting portion 65, projection 69 being adapted to engage a recording lever to be described later.

A spring 70 has one end anchored to the base plate 61 and the other end to the lever 67, whereby the projection 68 is urged inwardly of the tape cartridge mounting portion 65 but such pivotal movement of the lever 67 is limited by a pin 71 fixed on the base plate 61 so that said projection 68 is held in a position slightly inwardly of the tape cartridge mounting portion 65.

On the other hand, the recording lever 73, which is provided in the proximity of the other end of the lever 67, is vertically movably supported by an angle 74. The recording lever 73 has a is a roller through-hole 72 formed in the central portion thereof, in which the aforesaid projection 69 at the end of lever 67 is received. The lower end of the recording lever 73 is made narrow and received in a hole 75 formed in the base plate 61. A spring 77 is mounted on the narrow portion of the recording lever 73 with one end bearing against the base plate 61 and the other end against a spring seat formed at the top end of the narrow portion, whereby said recording lever 73 is biased upwardly.

A rotary lever 80 having a U-shaped cross-secton is rotatably mounted on the base plate 61 by means of a pin 79. The recording lever 73 has a downwardly inwardly sloped edge 31 which is located at a point above the rear edge of the flexed top section 78 of the U-shaped rotary lever 80 and closer to the lever 67 than the pin 79. It will be understood, therefore, that when the recording lever 73 is depressed downwardly against the spring 77, the sloped edge 81 of said recording lever 73 abuts against the rotary lever 80 causing said rotary lever to rotate in a clockwise direction. An arm 82 is formed integrally with the lower section of the U-shaped rotary lever 80 and extending therefrom in a direction opposite to the lever 67. The tip end of the arm 82 is in engagement with a shaft 84 of an operation shifting rotary knob 83 for shifting the magnetic tape recording and reproducing apparatus from the stationary state to the state of recording or reproduction, the state of fast forward or the state of rewinding. A spring 85 which is anchored to the base plate 1 at one end and to the rotary lever 80 at the other end, is provided to prevent a clockwise rotation of said rotary lever 80 upon engagement of the tip end of the arm 82 with the shaft 84.

On the other hand, the operation shifting knob 83 has a cam plate 86 fixedly connected thereto for simultaneous rotation and said cam plate carries a pin 87 fixed thereon. The pin 87 is provided at such a location that it will be received in an arcuate recess 88 formed at the tip end portion of the arm 82 when the rotary lever 80 is rotated against the biasing force of the spring 85 upon depression of the recording lever 73.

On the base plate 61 is also provided a switch 89 by which the electric circuit of the magnetic tape recording and reproducing apparatus is shifted from the state of reproduction to the state of recording. An operating strip 90 of the switch 89 is operated by the rotary lever 80 when said rotary lever is rotated in a clockwise direction.

As described, the operating strip 90 of the switch 89 is operated by the tip end of the rotary lever 80, whereby the internal electric circuit is shifted. However, the rotary lever 80 is not brought into contact with the switch-operating strip 90 when rotated only by depressing the recording lever 73 against the spring 77 but is brought into contact with the switch-operating strip 90 only when it is further rotated clockwise by the operation of the operation shifting knob 83 as will be described later.

Figure 8:
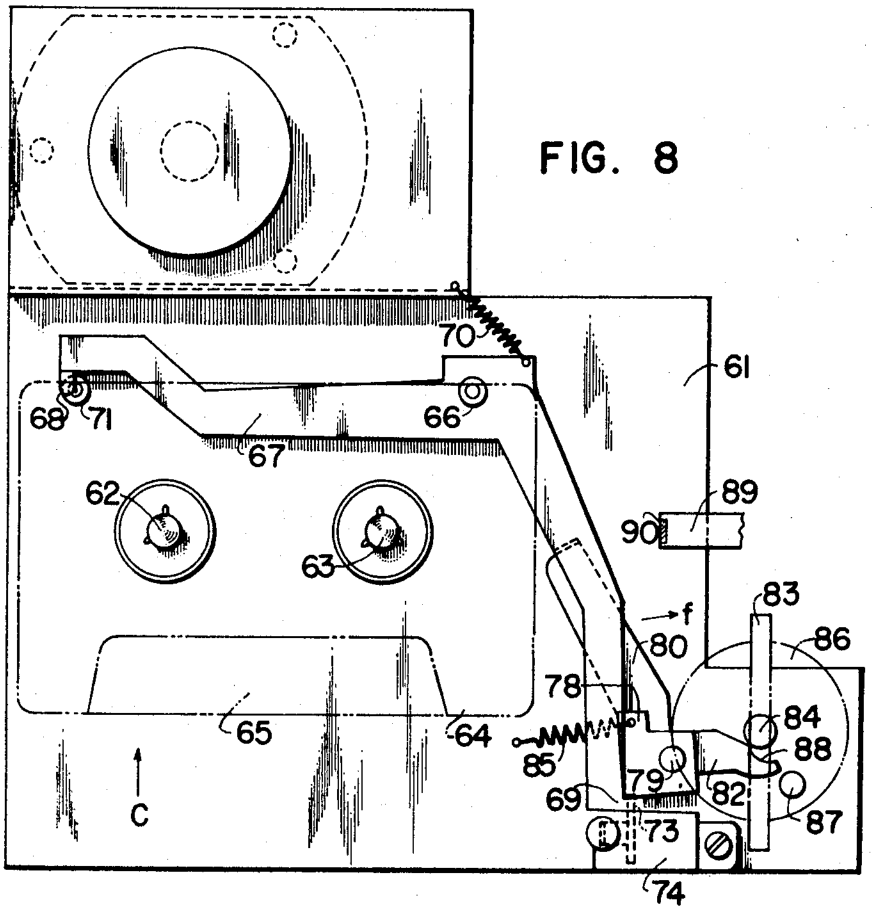
FIG. 8 is a top plan view of the mechanism mainly showing a dual-recording preventing mechanism in a stationary position, with no cartridge tape or with an unusable cartridge tape mounted thereon.

The mechanism constructed as described above will operate in the following manner: Namely, when the operation shifting knob 83 is located at a stop position and the tape cartridge 64 is not placed on the cartridge-mounting portion 65, as shown in FIG. 8, the projection 68 is located inwardly of the cartridge-mounting portion 65 and the projection 69 is received in the through-hole 72 of the recording lever 73, since the lever 67 is biased by the spring 70. In this state, the recording lever 73 cannot be depressed because the downward movement of said recording lever is blocked by the projection 69 in engagement with the top edge of the through-hole 72. On the other hand, the rotary lever 80 is positioned in substantially parallel relation to the arm of the lever 67 extending from the flexed portion to the projection 69, since the arm 82 of said rotary lever 80 is in abutment against the shaft 84.

Figure 9:
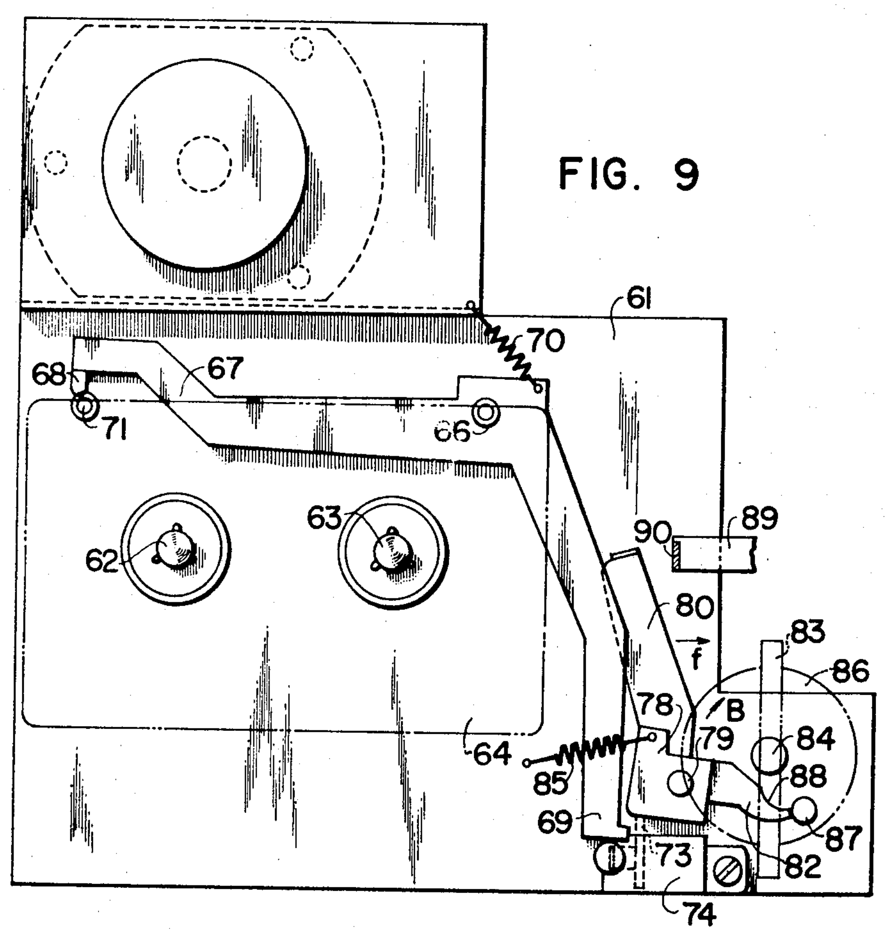
FIG. 9 is a top plan view showing the position of the mechanism shown in FIG. 8 after a recording cartridge tape mounted thereon and a recording lever is placed in a recording position.
Figure 10:
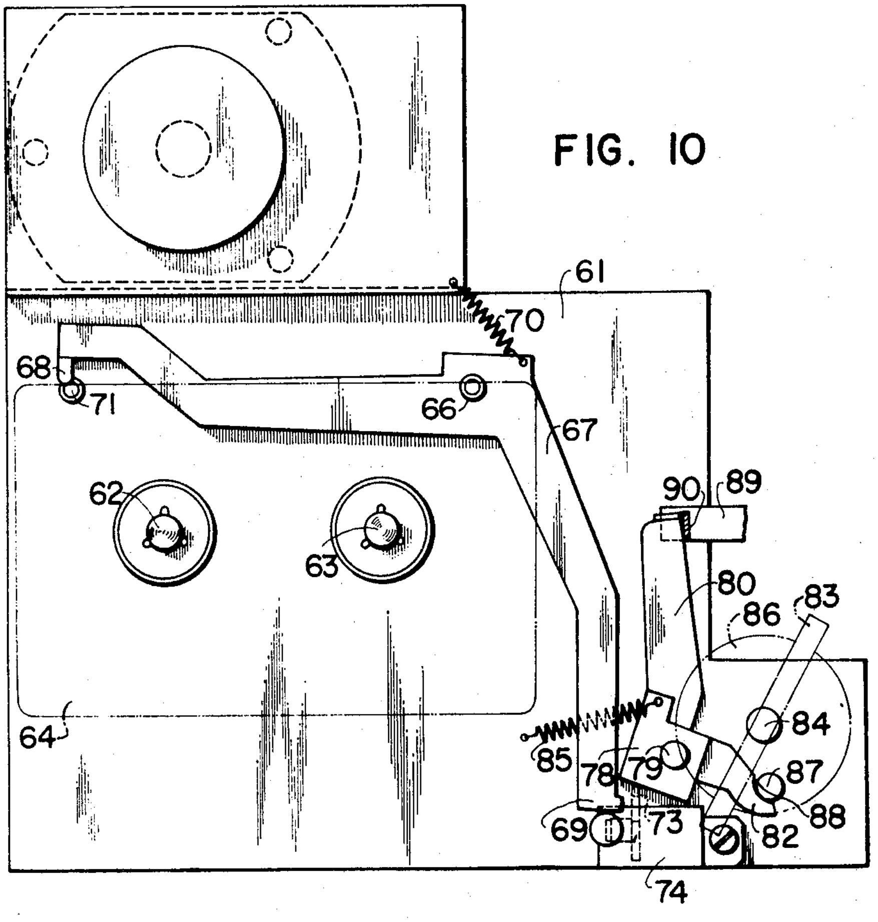
FIG. 10 is a top plan view showing the position of the mechanism shown in FIG. 8 after the operation-shifting means is revolved from the position shown in FIG. 9 to a recording position.
Figure 11:
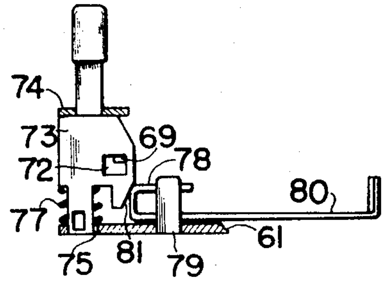
FIG. 11 is a sectional side view of the recording lever and associated parts thereof before the mechanism is placed in an operative position.
Figure 12:
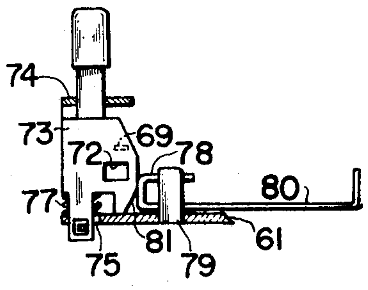
FIG. 12 is a sectional side view showing the positions of the recording lever and the associated parts thereof after said recording lever is placed in an operative position.

In this state, the tape cartridge 64 (the ordinary recordable tape cartridge) is mounted on the reel shafts 62, 63 from above the cartridge-mounting portion 65 while slightly moving said cartridge in the direction of arrow C, whereby the projection 68 of lever 67 is pushed backwardly by the rear end wall of cartridge 64 as shown in FIG. 9, causing the lever 67 to make a clockwise rotation against the biasing force of the spring 70.

Incident to the rotation of lever 67, the projection 69 at the other end thereof is moved out of the hole 72 in the recording lever 73, providing for depression of said recording lever and accordingly the apparatus is ready for recording. For recording the tape in the tape cartridge 64, the recording lever 73 is depressed and the operation shifting knob 83 is revolved in the direction of arrow B to set the tape driving system in a recording position while holding said recording lever in the depressed position. Namely, when the recording lever 73 is depressed against the biasing force of the spring 77, the sloped edge 81 urges the edge of the upper section 78 of the rotary lever 80, causing said rotary lever to rotate in a clockwise direction as shown in FIG. 9. However, when the recording lever 73 has reached the end of its downward stroke, the rotary lever 80 does not yet abut against the operating strip 90 of the switch 89. The operation shifting knob 83 is revolved in the direction of the arrow B in this state, whereby the cam plate 86 integral with said operation shifting knob is rotated simultaneously, bringing the pin 87 thereon into engagement with the tip end of the arm 82 of rotary lever 80. As the pin 87 moves into the recess 88 of arm 82, the arm 82 is urged outwardly by the pin 87, so that the rotary lever 80 is further rotated clockwise from the position shown in FIG. 9 to the position shown in FIG. 10 and as a result the rotary lever is brought into contact with the switch operating strip 90 causing the same to slide to the right. Thus, the switch 81 is actuated to shift the electric circuit to a recording position. In this case, the tape-driving system is also shifted to a position of normal speed recording by the revolution of the operation shifting knob 83 in the direction of arrow B, so that the apparatus is now ready for recording.

The switch operating strip 90 of switch 89 is maintained in the rightward "ON" position or the recording position throughout the period wherein the operation shifting knob 83 is held in the recording position by a locking mechanism (not shown). On the other hand, the recording lever 73 is maintained in its depressed position by a locking mechanism (not shown) which is adapted to be brought into effect upon revolution of the operation shifting knob 83, so that said recording layer will not be returned to its original position even when the depressive force is removed therefrom.

The apparatus which has been set in the recording position in the manner described, may be returned to the inoperative position by revolving the operation shifting knob 83 back to the original stop position.

Namely, when the operation-shifting knob 83 is returned to its original position, the pin 87 is moved in a counterclockwise direction allowing the rotary lever 80 to rotate counterclockwise under the biasing force of the spring 85. As a result, the switch operating strip 90 is returned to its original position thereby shifting the electric circuit to a state of reproduction. On the other hand, the recording lever 73 is released from the locked state incident to the return revolution of the operation-shifting knob 83 and returns to its original position under the bias of the spring 77. By the upward movement of the recording lever 73, the rotary lever 80 is further rotated in a counterclockwise direction under the bias of the spring 85 and resumes the position in which it was held before the apparatus was shifted into the recording position.

In the case when the cartridge 64 contains a recorded tape for reproduction, the cartridge is provided with a recess in the rear end wall thereof at a location corresponding to the projection 68 of the lever 67. Therefore, when such a cartridge is mounted on the cartridge mounting portion 65, the projection 68 is received in said recess, so that the lever 67 is held in the position shown in FIG. 8, that is, the position before the cartridge is mounted and accordingly the downward movement of the recording lever 73 is blocked by the projection 69 of lever 67 extending into the hole 72 of said recording lever. Thus, it is possible to accurately avoid dual recording.

According to the present invention, as described above, the dual recording preventing lever is flexed substantially in an L-shape and pivotally mounted at the flexed portion. Such an arrangement is advantageous in that since the lever enables the type of cartridge to be detected at any point of the base plate, the location of the recording lever can be selected optionally. In other words, the recording lever can be provided at a location which is most convenient for cooperation between it and the operation shifting knob to control the tape-driving mechanism. This enables the operability of the magnetic tape recording and reproducing apparatus to be greatly enhanced.

Furthermore, the fact that the location of the recording lever can be selected freely, is highly advantageous for a compact magnetic tape recording and reproducing apparatus, namely, of the cassette-type. Such an advantage can be brought about by the present invention, only by flexing the dual-recording preventing lever into L-shape and pivotally mounting the same at the flexed portion.

Figure 15:
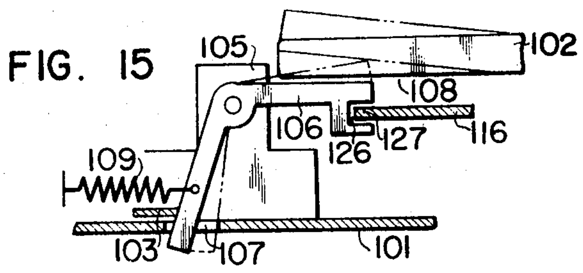
FIG. 15 is a sectional side view of a tape cartridge lifting mechanism.

Next, a cartridge-lifting mechanism which is included within the scope of this invention, will be described by way of example with reference to FIGS. 13 to 15 inclusive. Namely, the cartridge lifting mechanism according to the present invention includes an operating lever 103 which is pivotally mounted on a base plate 101 of a magnetic tape recording and reproducing apparatus and by which a tape cartridge 102 is lifted. The rear end of the operating lever 103 is located in such a position that it engages a downwardly extending arm of an L-shaped cartridge lifting lever 106 from the outside. The cartridge lifting lever 106 is pivotally mounted on a fixed bracket 105 with the downwardly extending arm thereof protruding through a hole 107 formed in the base plate 101. The other arm of the cartridge lifting lever 106 extends along the underside of a cartridge mounting portion 108 in parallel to the undersurface of a tape cartridge 102 mounted on said cartridge-mounting portion, and urged downwardly under the biasing force of a spring 109 which is anchored to the end of the downwardly extending arm of said lifting lever at one end and to the frame of the apparatus at the other end.

On the base plate 101 is also provided an operation-shifting knob 110 which is rotatably mounted on a shaft 111 and by which the apparatus is shifted from the inoperative state to the state of recording, reproduction or rewinding. A cam plate 112 having notches formed peripherally thereof is fixedly mounted on the shaft 111 of operation-shifting knob 110, whereas a lever 113 provided with a roller 114 is pivotally mounted on the base plate 101 at one end, with the other end biased by a spring 115. Thus, it will be seen that the roller 114 is held in pressure contact with the peripheral edge of the cam plate 112 and the position of the operation shifting knob 110 is secured by the engagement between said roller and said notches.

Also provided on the base plate 101 is a movable base plate 116 which is slidably movable toward or away from the tape cartridge 102 and carries thereon a pinch roller 117, a recording or reproducing head 118 and an erasing head 119. This movable base plate 116 is held in spaced relation to the tape cartridge 102 and accordingly the pinch roller 117 and the recording or reproducing head 118, etc. are held in a retracted position relative to said tape cartridge when the operation shifting knob 110 is in the stop position, but is moved toward the tape cartridge 102 carrying said pinch roller and said recording or reproducing head, etc. into said tape cartridge when the operation shifting knob 110 is shifted to the recording or reproducing position.

The movable base plate 116 is operatively associated with the operation-shifting knob 110 in the following manner: Namely, the cam plate 112 rotated by the operation shifting knob 110 carries a pin 120 fixed thereon for engagement with one end of a rotary lever 121 which is pivotally mounted on the base plate 101 by means of a pivot pin 122, with the other end thereof extending beneath the movable base plate 116. The rotary lever 121 has an upright lug 124 formed at that end which is located below the movable base plate 116, while the movable base plate 116 has an upright lug 123 formed at a location opposite said upright lug 124 of rotary lever 121, and these upright lugs 123 and 124 are operatively connected with each other by a spring 125, whereby the movable base plate is biased toward the rotary lever 121.

The rotary lever 121 is held in a counterclockwise position when the operation shifting knob 110 is in the stop position, and therefore the movable base plate 116 is held in the retracted position relative to the tape cartridge 102. When, however, the operation-shifting knob 110 is revolved into the recording or reproducing position, the rotary lever 121 is rotated in a clockwise direction by the action of the pin 120, so that the movable base plate 116 is moved forward carrying the pinch roller 117 and the recording or reproducing head 118 into the tape cartridge 102.

The cartridge lifting lever 106 has a notch 126 formed in that end which is located beneath the tape cartridge 102. The notch 126 is located in the same plane as the movable base plate 116 to receive an engaging lug 127 formed at a portion of said movable base plate. The lug 127 of the movable base plate 116 is received in the notch 126 of the lifting lever 106 when said movable base plate is advanced incident to the revolution of the operation-shifting knob 110, that is, when the magnetic tape recording and reproducing apparatus is placed in a recording or reproducing position.

Figure 13:
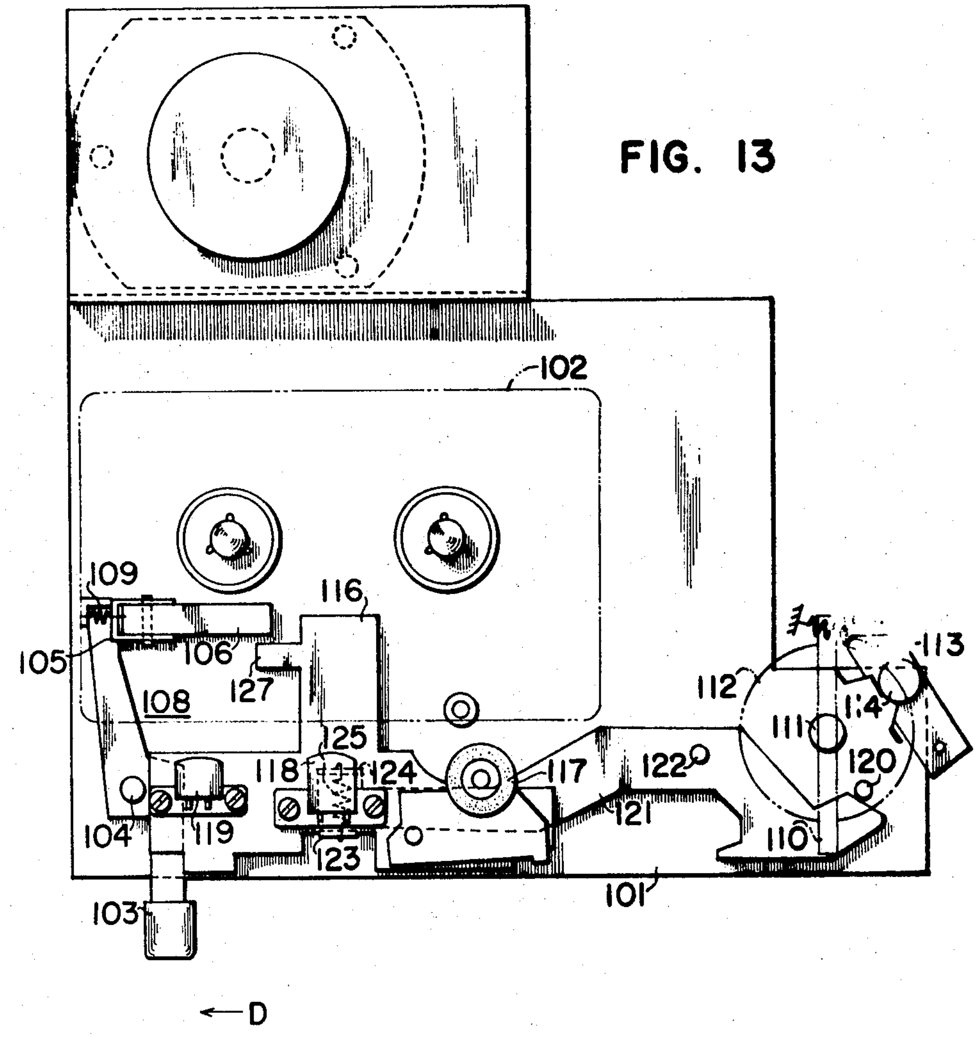
FIG. 13 is a top plan view of the mechanism mainly showing a tape cartridge lifting portion.

In describing the operation of the apparatus constructed as described briefly above, when the magnetic tape recording and reproducing apparatus is in the inoperative position as shown in FIG. 13, the movable base plate 116 is in the retracted position with the engaging lug 127 disengaged from the notch 126 of cartridge lifting lever 127. Now, when the operating lever 103 is rotated in the direction of the arrow in such state, the cartridge lifting lever 106 is pivoted to a position shown by the broken line in FIG. 13 against the biasing force of the spring 109, thereby lifting the tape cartridge 102.

Figure 14:
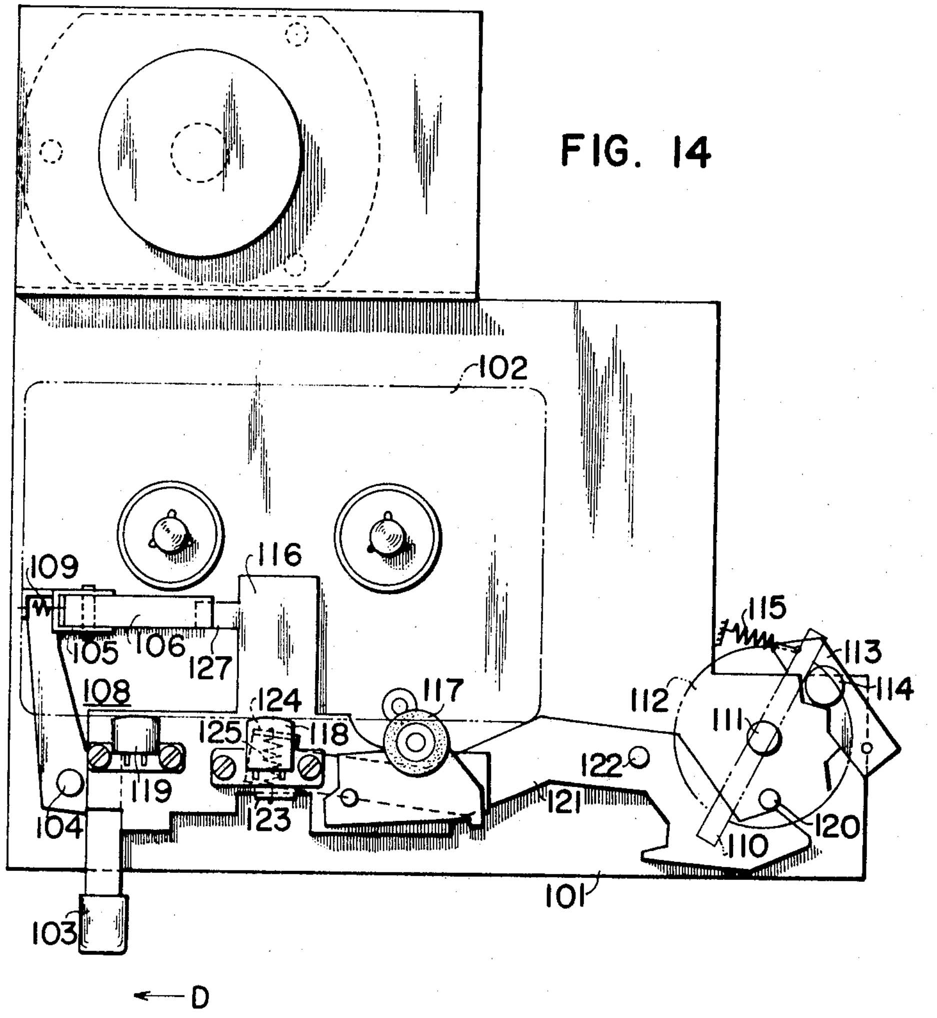
FIG. 14 is a top plan view of the mechanism shown in FIG. 13 in a recording position.

On the other hand, when the operation shifting knob 110 is revolved from the stop position shown in FIG. 13 to a recording or reproducing position shown in FIG. 14, the rotary lever 121 is pivoted clockwise by the pin 120, whereby the movable base plate 116 is moved forward by being pulled by the spring 125, with the result that the pinch roller 117, the recording or reproducing head 118 and the erasing head 119 are carried into the tape cartridge 102 and at the same time the engaging lug 127 is received in the notch 126 of the cartridge lifting lever 106, thus providing for recording or reproduction.

If an attempt is made to lift the tape cartridge by pivoting the operating lever 102 in the direction of the arrow in this state, the cartridge lifting lever 106 is held motionless by the engaging lug 127 of movable base plate 116. Namely, the tape cartridge 102 cannot be lifted in the state of recording or reproduction.

However, when the apparatus is returned to the original inoperative position upon revolution of the operation shifting knob 110, the rotary lever 121 is allowed to pivot counterclockwise and accordingly the movable base plate 116 is returned to the original position shown in FIG. 13 under the biasing force of the spring 125. The engaging lug 127 is disengaged from the notch 126 of cartridge lifting lever 106, thus providing for lifting of the tape cartridge 102.

Figure 16:
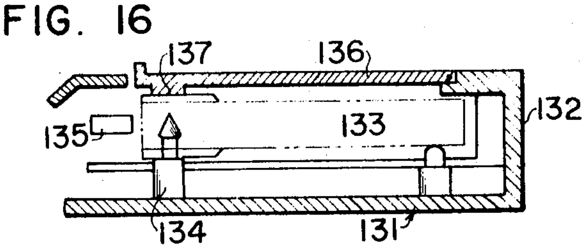
FIG. 16 is a schematic sectional side view showing a manner in which the cartridge tape is mounted.

Description will now be made, by way of example, on the tape cartridge mounting device in the apparatus of this invention with reference to FIGS. 1 and 16. In the Figures, reference numeral 131 designates the body of a cassette-type magnetic tape recording and reproducing apparatus, 132 a cavity formed in the top surface of said body 131, 133 a tape cartridge with a magnetic tape accommodated therein mounted in said cavity 132, 134 a cartridge positioning pin, 135 a head located opposite to the tape-running face of the cartridge 133 and 136 a cover to close the top opening of the cavity 132 after the tape cartridge 133 is mounted therein, said cover being provided with a plurality of pads 137 on the inner surface thereof either integrally therewith or separately therefrom to depress the top surface of the tape cartridge.

When the device is used, the tape cartridge 133 is mounted in the cavity 132 in the body 131 and then the top opening of said cavity is closed by the cover 136. The tape cartridge in the cavity is depressed by the pads 137 and thereby the tape in the cartridge 133 is located in a desired position opposite to the head 135.

In conventional magnetic tape recorders of this type, there has been the danger that a tape cartridge is not properly situated in the cavity with the consequence that the head is damaged by said tape cartridge.

According to the present invention as described above, however, the tape cartridge mounted in the cavity is always situated in a proper position by being depressed by the pads provided on the inner surface of the cover upon closure of said cover, so that not only is it possible to avoid damage to the head but also satisfactory recording or reproduction is ensured. It is to be understood that the pad may be formed of a material which is the same as or different from the material of the cover, it may be formed integrally with the cover or provided separately from and adhesively bonded to the cover, and may be provided simply or severally. Use of a pad or pads of a soft material, such as rubber or felt, is advantageous in protecting the tape cartridge from damage.

What is claimed is:

1. A cassette-type tape recording and reproducing apparatus for use with cassettes having a cut-out portion indicating the presence of a prerecorded tape in said cassette, comprising:

a base plate;

operating mode changing means, including a cammed member, mounted on said base plate, for shifting said recording and reproducing apparatus between the recording/reproducing, rewinding and fast forward states;

switch means for switching the electrical circuitry of said apparatus between recording and reproducing states;

record actuation means for switching said switch means between said recording and reproducing states;

detecting means pivotally mounted on said base plate for detecting the presence of a prerecorded tape in a cassette mounted on said apparatus, said detecting means being movable between a first position indicating the presence of said cut-out portion and a second position indicating the absence of said cut-out portion;

blocking means coupled to said detecting means, said blocking means being moved into engagement with said record actuation means by said detecting means when the latter is in said first position, said blocking means being moved out of engagement with said record actuation means when said detecting means is in said second position, wherein the engagement of said blocking means with said record actuation means prevents the latter from switching said switch means from a reproducing mode to a recording mode;

a pin mounted on said cammed member; and hold means rotatably mounted on said apparatus and engaging said record actuation means, said hold means being rotated into a position of engagement with said pin by movement of said record actuation means, said hold means being moved by said pin into contact with said switch means to hold the latter in its recording mode when said operating mode changing means is moved into the recording/reproducing state.

2. The apparatus according to claim 1, wherein said detecting means comprises an L-shaped lever pivotally mounted at the junction of the two arms of said lever, said lever having a projection at the end of one arm for detecting the presence and absence of said cut-out portion, said blocking means being provided at the end of the other arm of said lever.

* * * * *